United States Patent
Ni

(10) Patent No.: US 11,196,582 B2
(45) Date of Patent: Dec. 7, 2021

(54) ADAPTING TO DIFFERENCES IN DEVICE STATE REPORTING OF THIRD PARTY SERVERS

(71) Applicant: Google LLC, Mountain View, CA (US)

(72) Inventor: Yuzhao Ni, London (GB)

(73) Assignee: GOOGLE LLC, Mountain View, CA (US)

( * ) Notice: Subject to any disclaimer, the term of this patent is extended or adjusted under 35 U.S.C. 154(b) by 392 days.

(21) Appl. No.: 16/343,927

(22) PCT Filed: Feb. 8, 2019

(86) PCT No.: PCT/US2019/017335
§ 371 (c)(1),
(2) Date: Apr. 22, 2019

(87) PCT Pub. No.: WO2020/162948
PCT Pub. Date: Aug. 13, 2020

(65) Prior Publication Data
US 2021/0281437 A1    Sep. 9, 2021

(51) Int. Cl.
*H04L 12/28* (2006.01)
*G10L 15/22* (2006.01)
*G10L 15/30* (2013.01)

(52) U.S. Cl.
CPC ............ *H04L 12/283* (2013.01); *G10L 15/22* (2013.01); *G10L 15/30* (2013.01); *H04L 12/282* (2013.01); *G10L 2015/223* (2013.01)

(58) Field of Classification Search
CPC ... G10L 2015/223; G10L 15/30; G10L 15/22; H04L 12/282; H04L 12/283
See application file for complete search history.

(56) References Cited

U.S. PATENT DOCUMENTS

| 9,148,802 B2 * | 9/2015 | Jackson ............... H04W 24/02 |
| 11,037,555 B2 * | 6/2021 | Kothari ................ G06F 1/3203 |
| 2003/0078784 A1 | 4/2003 | Jordan et al. |

(Continued)

OTHER PUBLICATIONS

European Patent Office; International Search Report and Written Opinion of Ser. No. PCT/US2019/017335; 12 pages; dated Nov. 19, 2019.

*Primary Examiner* — Michael Colucci
(74) *Attorney, Agent, or Firm* — Middleton Reutlinger

(57) ABSTRACT

Implementations herein relate to information describing one or more internal states of a technical system. Implementations herein are provided for characterizing reliability of various different third party servers, at least when reporting third party device statuses, as well as adapting protocols for device ecosystems affected by such reliability. Latency can affect accuracy of device states represented by assistant devices. Certain servers can be characterized as especially delayed when reporting an updated device state in response to a user request, and, as a result, the third party server can be correlated to a metric that characterizes the relative latency of the third party server. When the metric fails to satisfy a particular threshold, a server and/or client associated with the "ecosystem" of third party devices can affirmatively operate to retrieve device state updates, rather than passively await updates from a corresponding third party server.

20 Claims, 7 Drawing Sheets

(56) References Cited

U.S. PATENT DOCUMENTS

| | | | |
|---|---|---|---|
| 2010/0233970 A1* | 9/2010 | Pummer | G08C 17/02 455/70 |
| 2012/0130513 A1 | 5/2012 | Hao et al. | |
| 2013/0318204 A1* | 11/2013 | Bennett | H04N 21/2541 709/218 |
| 2013/0328667 A1* | 12/2013 | Kumar | G08C 17/02 340/12.5 |
| 2014/0159877 A1* | 6/2014 | Huang | G08C 17/02 340/12.5 |
| 2015/0019710 A1 | 1/2015 | Shaashua et al. | |
| 2015/0341418 A1* | 11/2015 | Zhou | H04L 67/10 715/740 |
| 2016/0226732 A1 | 8/2016 | Kim et al. | |
| 2016/0360018 A1* | 12/2016 | Watson | H04M 1/6066 |
| 2018/0041401 A1* | 2/2018 | Hugman | H04L 41/085 |
| 2018/0322881 A1 | 11/2018 | Min et al. | |
| 2018/0359674 A1 | 12/2018 | Lu | |
| 2019/0027018 A1* | 1/2019 | Corpus | G08B 29/04 |

* cited by examiner

ADAPTING TO DIFFERENCES IN DEVICE STATE REPORTING OF THIRD PARTY SERVERS

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., spoken utterances), which may in some cases be converted into text and then processed, and/or by providing textual (e.g., typed) natural language input. An automated assistant may respond to a request by providing responsive user interface output, which can include audible and/or visual user interface output.

In many cases, users can provide spoken utterances to cause an automated assistant to perform various actions in furtherance of controlling particular devices. Certain devices can be made available by third party entities, which can exhibit various levels of dependability with respect to regularly providing operational data to a user's automated assistant. For instance, third party entities employing servers that do not reliably push device status updates to an automated assistant may cause inaccurate status data to be provided to users and for users to mistakenly rely on the inaccurate status data. As a result, a user that consistently relies on an interface of their automated assistant device to determine statuses for certain devices may be presented with information which does not accurately represent one or more internal states of the devices and/or one or more internal states of a wider technical system in which the devices reside. The user may unintentionally leave certain devices running, or not running, based on such inaccurate status data, thereby causing an undesirable consumption of resources. Furthermore, a user may deploy inconsequential requests to modify settings of devices whose settings have already been suitably modified, thereby wasting network bandwidth and processing resources. For example, a user that relies on their automated assistant to determine an operating status of their lights or a furnace may not be privy to recent operational data that is otherwise available at a third party server. Such recent operational data may cause the user to be presented with inaccurate information concerning the internal state(s) of the lights and/or the furnace. As a result, the user may cause certain requests to be transmitted to the third party server for controlling the lights and/or the furnace, based on inaccurate status data. For instance, the user may issue a spoken command to their automated assistant to turn off a set of lights in their living room, even though the set of lights may already be off. As a result, the spoken command would nonetheless be processed and, for example, transmitted to an automated assistant server, and a third party server, which may then reject the command in view of the lights already being off. Such inconsequential transactions occurring across many devices can result in wasteful network traffic and power consumption.

SUMMARY

Implementations set forth herein relate to information describing one or more internal states of a technical system. Implementations set forth herein are provided for characterizing reliability of various third party servers, at least with respect to reporting third party device states to an automated assistant, client device, and/or another server device. Furthermore, some implementations relate to adapting protocols for eliminating negative effects of such latency on the automated assistant and/or a corresponding device ecosystem. A particular ecosystem, such as a network of computing devices connected to a local area network, can exhibit a variety of different states during the operational lifetime of the devices. Some ecosystems can include at least one assistant device, through which a user can control various devices within their ecosystem, by providing requests to an automated assistant, which can be accessible via the assistant device. As states of the devices within the ecosystem are modified according to requests and/or other commands, the automated assistant can track the states of the devices. For example, in order for the automated assistant to ascertain a state of a particular device, such as a smart light bulb within a home, a third party server associated with the smart light bulb can provide a status update to a first party server (e.g., a first party server relative to the automated assistant and the third party smart light bulb) associated with the automated assistant.

However, disparities in reliability of third party servers, to timely provide status updates reflecting accurate states of devices, can affect an accuracy of status information provided by the automated assistant to one or more users. For example, a particular smart device manufacturer may not provide status updates to the first party server and/or assistant device (or may provide them with significant latency) in response to a user manually controlling a smart device (e.g., flipping a light switch off for a smart light bulb), without assistance from the automated assistant. As a result, should the user subsequently request states of all of their devices within their respective ecosystem, a status for that particular smart device may be presented inaccurately. Such inaccuracies can result in a wasting of energy and/or computational resources. For example, a user that has manually adjusted a smart light bulb, and subsequently checked the status (i.e., state) of the smart light bulb before going to bed, may be provided with inaccurate and misleading status information concerning the smart bulb and, therefore, may not realize that the smart light bulb is remaining on throughout the night. Had the user been provided more accurate status information, the user would have been able to turn off the light bulb before bed via the assistant device, thereby preserving energy resources at the home and/or any other affected device. Alternatively, the user may provide a command to turn on their smart light bulb when a status of the smart light bulb is indicated as off, but the light is actually on. Such a command being provided by the user can result in a waste of computational and/or network resources, as at least speech to text processing and/or network transmissions would need to be completed, only for a corresponding server device to reject the command in view of the light already being on.

Implementations discussed herein allow the automated assistant to proactively request device statuses for devices within an ecosystem according to one or more different metrics that characterize a reliability of one or more server devices and/or other support system(s) associated with those devices. A support system can refer to a server device and/or client device that is tasked with managing device states for devices, as well as reporting those device states to other servers, clients, applications, and/or any other apparatus or module. In some implementations, a latency based metric can be generated for one or more support systems, corresponding to one or more devices that are controllable via an automated assistant. The latency based metric can be generated using time data that characterizes an amount of time that transpires between a request (e.g., from an automated assistant) for a device status to change and a reporting of updated device status to the automated assistant, a first-party server device, and/or client device that is associated with the automated assistant. The latency based metric can thereafter be used to make decisions about whether to proactively request an updated device state, for instance, when a third party server is typically unreliable with respect to proactively transmitting an updated status to the automated assistant. Furthermore, the latency based metric can also be used to make decisions about whether or when to not proactively request an updated device state, for instance, when a third party server has proven to be reliable with respect to proactively reporting updated device states to the automated assistant.

In some implementations, one or more metrics can be generated for gauging how particular server devices affirmatively report device status changes. For instance, a smart device that is connected within an ecosystem can be controllable via the automated assistant as well as a third party application. Should a user elect to control that particular smart device via the third party application, the server device can receive the request from a third party application, and cause the status change of the device to occur. However, the third party server may not diligently provide an updated status to the automated assistant. For example, although some third party servers may proactively provide a status update to the automated assistant immediately in response to a third party application causing the device status change, some third party servers may not be as proactive. For instance, some third party servers may not provide the device status update to the automated assistant, and/or may provide the device status update after some amount of delay. Based on such omissions and/or delays exhibited by the third party servers, one or more metrics for the third party servers can be generated.

In some implementations, a metric of the one or more metrics can be determined based on a probability that a particular third party server will proactively provide status updates to an automated assistant and/or a probability that, at any given time, the automated assistant will have accurate status data (as provided by a third party client device and/or the particular third party server device). When a particular metric does not satisfy a threshold, the automated assistant can elect to more frequently query the third party server for status updates for certain devices. Alternatively, when the particular metric does satisfy a particular threshold, the automated assistant can bypass querying the third party server for status change updates, at least in view of the third party server having a history of proactively providing such device status updates.

In some implementations, one more metrics can affect a variety of different operations performed by the automated assistant. For instance, a user can provide a gesture (e.g., a tap or slide gesture) at a touch display panel of an assistant device in order to cause the assistant device to present operational statuses for multiple different devices associated with an "ecosystem" corresponding to the user. The operational statuses can be rendered as graphical display elements that characterize an operational status of the devices (e.g., a graphic depicting a light that is shining bright to indicate that a particular smart light bulb is on; another graphic depicting a padlock that is in a closed position to indicate that an alarm system has been secured; and yet another graphic depicting a thermometer and indicating a current temperature of a room in a home of the user.). In response to receiving the input gesture, the assistant device and/or a corresponding server device can cause one or more metrics to be accessed. Each metric, of the one or more metrics, can correspond to a particular device (e.g., an alarm system, a thermostat, and a light). Furthermore, each metric can be used, in response to the gesture, to determine whether to query third party server for a current status of each particular device, or to bypass querying the third party server for the current status of each particular device (at least under the assumption that a value of the metric provides some basis (e.g., satisfies a threshold), or fails to provide some basis, from which to assume that a third party server device supporting the particular device is reliable with respect to pro-actively providing updates about operational status changes for the particular device). Therefore, in some instances, the assistant device can query one or more third party server devices based on the one or more metrics, and/or bypass querying one or more third party server devices based on the one or more queries.

As another example, in some implementations, an automated assistant can perform a routine, which can be a combination of operations performed according to settings of the routine. A routine can be, for example a "Good Night" routine, which can be established by a user in order to consolidate, into a single request, various automated assistant operations that are typically requested by the user before bed. Operations corresponding to a "Good Night" routine can include, for example, one or more of (1) turning off various smart lights within a home, (2) turning on a security alarm for a home, and (3) playing some amount of audio that the user typically likes to hear while in bed. During performance of the routine, the automated assistant can access device state data corresponding to the security alarm and the smart lights. The accessed device state data can be the current device state data maintained by the automated assistant based on prior communications with third-party server(s). Furthermore, the automated assistant can access one or more metrics corresponding to a server device for the smart light bulbs and a server device for the alarm system. The device state data can indicate that the lights are already off and that the security alarm is already activated. However, the automated assistant can determine, based on the one or metrics, whether to query each server device to confirm whether the statuses are correct. For instance, a metric for the server device for the smart light bulbs can satisfy a threshold and, based on (e.g. in response to) the metric satisfying the threshold, the automated assistant can bypass querying the server device for the status of the light bulbs. In other words, the automated assistant can determine that the particular server device has a history of proactively providing status updates consistently and/or in a timely manner, and, therefore, the metric can indicate that the data characterizing the device status is accurate.

However, in some instances, the metric corresponding to the server device supporting a device and/or system (e.g., the alarm system) may not satisfy the threshold. Therefore, based on (e.g. in response to) the metric associated with the alarm system not satisfying the threshold, the automated assistant can proactively query the corresponding server device in order to confirm whether the device status data is accurate. When the device status is not accurate, and therefore the alarm system is determined to have an inaccurate status, the automated assistant can undertake, during execution of the routine, the operation of requesting, from the corresponding server device, a change to the status of the security alarm. Optionally, and based on (e.g. in response to) the one or more metrics, the automated assistant can subsequently request a status verification for the alarm system from the server device. In other words, because the server device may not have a history of consistently and/or timely affirmatively providing a device status update after a request for a device status change, the automated assistant can proactively confirm that the device status change actually went into effect.

Over time, one or more previously generated metrics can be modified according to changes in patterns of how proactive particular third party server devices are in reporting device statuses. For instance, a third party server device can become more proactive over time, or a third party server device can become less proactive over time. Factors influencing this can include: changes in total network traffic to a particular third party server device, increases in usage of devices and/or accounts by users, implementations of software upgrades by third party servers, expansion or reduction of available network servers, pushed updates, lack of support for prior versions of certain third party devices, and/or any other factors that can influence how proactive a server device is with respect to reporting device statuses. As an example, a metric for a particular third party server device may not satisfy a particular threshold initially, but, because of certain enhancements promulgated by a third party entity, the third party server device can become more proactive over time. As a result, the first party server, the automated assistant, and/or any other device tasked with tracking such metrics can modify a corresponding metric for the third party server device, in order to reflect the trend of the third party server device becoming more proactive. This can cause the automated assistant to reduce a frequency of status requests provided to the third party server device, at least in part because of the metric reflecting the reliability of the third party server device reporting device statuses. Furthermore, this can eliminate wasting of network resources, which might otherwise be consumed by device status requests being provided indiscriminately, at least relative to latency and/or accuracy of any previously provided device status changes.

In some implementations, one or more metrics, and/or one or more reference values can be generated to correspond to a particular device and for particular contexts (e.g., time of day, type of transaction, type of assistant device, type of third party server device, type of third party client device, particular user associated with particular device and/or command) of the particular device. As an example, a first metric for a particular device can characterize a reliability of a supporting third party server device during weekends (or any time range), and a second metric for the particular device can characterize a reliability of the supporting third party server device during the weekdays (or any other time range). In this way, when an assistant device is tasked with presenting an operational status of the particular device, the assistant device and/or assistant server device can identify a current context, and then select a metric based on the current context (e.g., a particular time of day). The selected metric can then be used to make a determination about whether to query the supporting third party server device for updated status data, or to decide that the supporting third party server device is reliable with respect to proactively providing such status updates.

It will be evident from the above discussion that implementations described herein may cause the information presented by an automated assistant device to more accurately represent an internal state of a technical system, such as the status of a technical system comprising one or more of a smart bulb, a furnace, or an electrical security alarm (to give only a few examples). This information can assist a user in performing technical tasks, including those associated with the technical system(s) whose internal state(s) is/are represented by the presented information. An example of such a task is controlling the technical system to adopt, or remain in, a particular internal state. The provision of inaccurate status data by the automated assistant device to users via a user interface of the automated assistant device may be reduced or avoided. Furthermore, the reliance on such inaccurate status data by the automated assistant device when implementing operations in technical systems may also be reduced or avoided.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
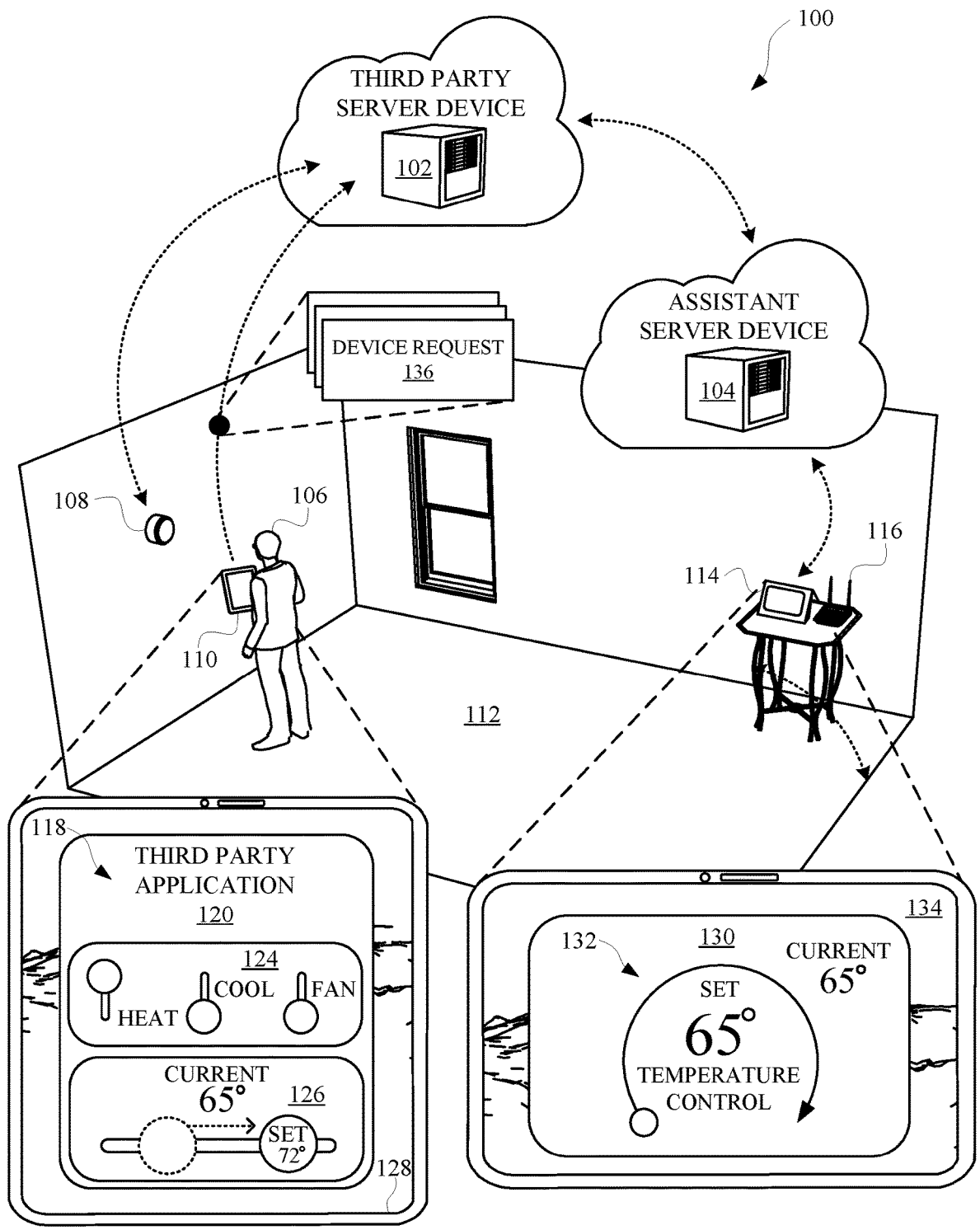
FIG. 1A and FIG. 1B illustrate views of an assistant server device adapting to changes in reliability, and/or patterns of reliability, of a third party server device when reporting status updates for a particular client device.
Figure 1B:
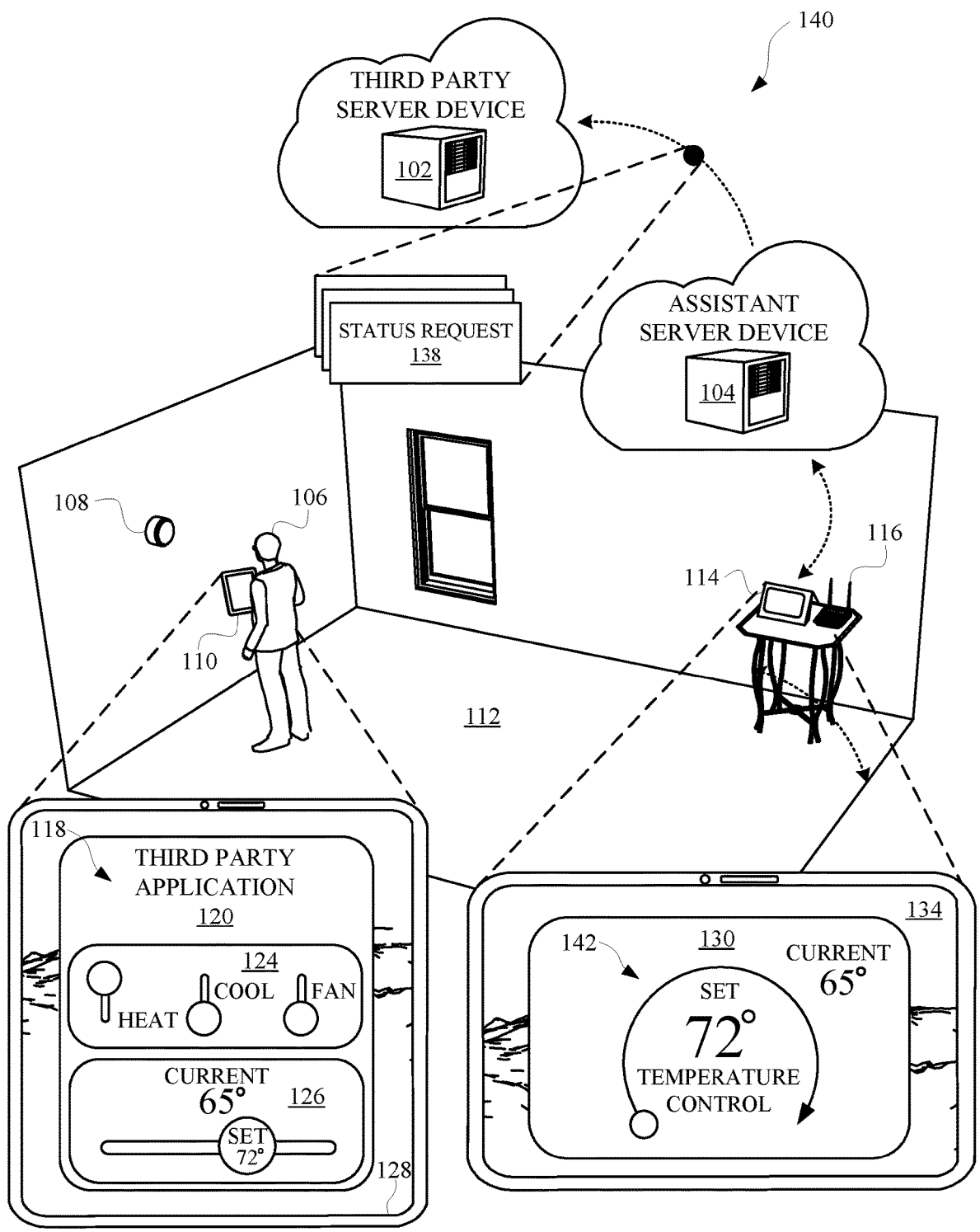

FIG. 1A and FIG. 1B illustrate view 100 and view 140, respectively, of an assistant server device 104 adapting to changes in reliability, and/or patterns of reliability, of a third party server device 102 when reporting status updates for a particular client device 108 (e.g., a thermostat). The client device 108 can be connected to a local area network that is provided via a wireless network source 116, such as a Wi-Fi router. Other client devices can also be connected to the local area network, such as a tablet device (and/or any computing device (i.e., client device 110) and an assistant device 114, which can be in communication with the assistant server device 104. The client device 110 can be controlled by a user 106 and can include a third party application 120, through which the user 106 can control the client device 108.

The user 106 can interact with the third party application 120 via an interface 118 of the third party application 120 in order to control the client device 108. The interface 118 can be presented at a display panel 128 of the client device 110, and can present the user with controls for modifying an operational status of the client device 108. For instance, the third party application 120 can present a first control interface 124 and a second control interface 126. The first control interface 124 can include various graphical control elements through which the user 106 can modify one or operations and/or settings of the client device 108. The second control interface 126 can include one or more graphical control elements from which the user 106 can control one or operations and/or settings of the client device 108.

For example, the interface 118 can provide a graphical control element from which the user 106 can change a temperature setting of the client device 108, when the client device 108 is a thermostat. The interface 118 can also include a current temperature reading (e.g., 65 degrees), which can present a current temperature in a room 112 in which the user is located. A current temperature of the room 112 can be 65 degrees, and the user can provide an input to a graphical control element of the interface 118 in order to adjust the room 112 temperature to be 72 degrees. In response to the user 106 providing, or otherwise interacting with the interface 118, the third party application 120 can transmit a device request 136 over the local area network to the third party server device 102. The device request 136 can cause an operating status of the client device 108 to change, in order to effectuate the settings change requested by the user 106 via the third party application 120.

The third party server device 102 can be tasked with updating server devices and/or client devices with changes to the operational status of the client device 108. For example, the user 106 can access the assistant device 114 in order to determine a status of the client device 108. The status of the client device 108 can be presented at a display panel 134 of the assistant device 114, according to status data that is available to the assistant device 114 and/or the assistant server device 104. However, if the third party server device 102 is not proactive about providing status updates to the assistant device 114, the assistant device 114 may not have accurate status data to present to the user 106. In other words, when a metric corresponding to the third party server device 102 indicates that the third party server device 102 is not reliable, the assistant device 114 can elect to query the third party server device 102 for an updated status, at least in response to a user input, such as a request for a status of the client device 108. Alternatively, when the metric corresponding to the third party server device 102 indicates that the third party server device 102 is reliable, the assistant device 114 can elect to rely on locally stored status data, and bypass querying the third party server device 102 for an updated status. In this way, the metric would mitigate the need to query the third party server device 102 every time the user 106 requested a status update for a particular client device.

However, in some implementations, the assistant server device 104 can determine a latency of the third party server device 102 when reporting status changes exhibited by the client device 108. One or more metrics can be generated based on the latency of the third party server device 102, and the one or more metrics can thereafter be used to determine whether to: proactively query the third party server device 102 for status updates regarding the client device 108, and/or bypass providing such queries, at least in furtherance of relying on the third party server device 102 to proactively communicate status data to the assistant server device 104.

For example, in response to the user 106 sliding a graphical control element 138 to change a setting of the client device 108 via the interface 118, a device request 136 can be transmitted to the third party server device 102. As a result, some amount of latency can be exhibited by the third party server device 102 when providing a corresponding status update to the assistant server device 104 and/or the assistant device 114. For example, latency can be, but is not limited to, a time period between the user 106 changing a setting of the client device 108, and the assistant server device 104 receiving updated status data.

As illustrated in FIG. 1B, the third party server device 102 can receive a status request 138 from the assistant server device 104 in response to the assistant device 114 and/or the assistant server device 104 not receiving a status update proactively from the third party server device 102. In other words, based on a metric generated from the latency of the third party server device 104, the assistant server device 104 can proactively determine whether to issue the status request 138 to the third party server device 102, or wait for the third party server device 102 to proactively send a status update to the assistant server device 104. In some implementations, a metric can be generated based on a latency corresponding to a time period between a device setting of the client device 108 being changed via the third party application 120, and a time when the assistant server device 104 and/or assistant device 114 has received an status data from the third party server device 102. Alternatively, or additionally, the metric can be generated based on a latency between a time that the third party server device 102 transmitted a most recent status update to the assistant server device 104, and a time when the third party server device 102 received a request from the third party application 120 and/or the user 106. In some implementations, a change in status of the client device 108 can be performed via the client device 110 and/or directly at an interface of the client device 108. For example, the client device 108 can include one or more interfaces that are controllable via a touch input, gesture input, spoken input, and/or any other input that can be provided by the user 106. In some implementations, the latency from which the metric is generated can be based on a period between a time when the client device 108 received a request from the user 106 at an interface that is physically integral to the client device 108, and a time when the assistant server device 104 and/or the assistant device 114 received a status update from the third party server device 102, subsequent to the request from the user 106.

Figure 2A:
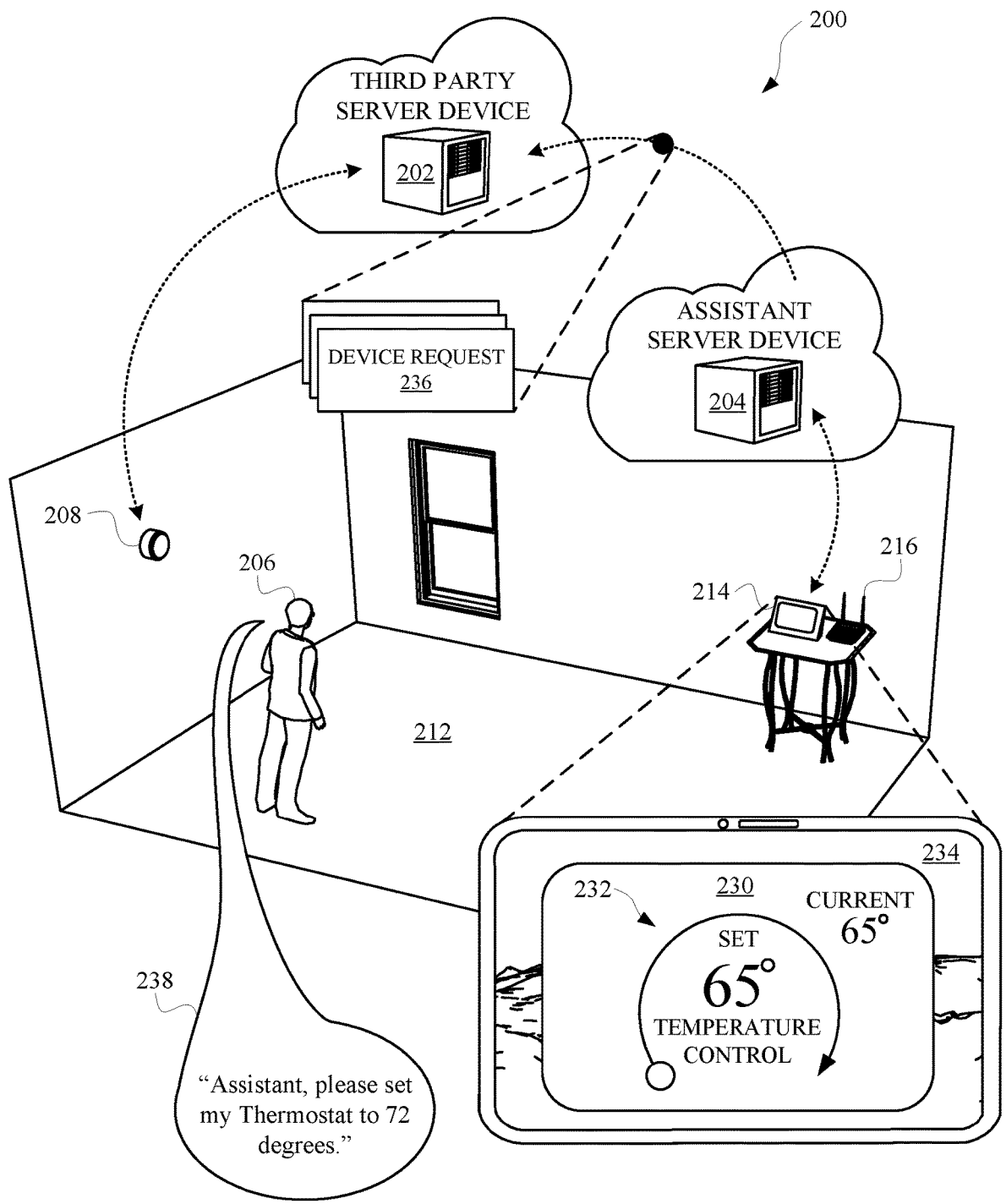
FIG. 2A and FIG. 2B illustrate views of an assistant server device adapting to reliability of a third party server device with respect to reporting status changes to a client device that provides access to an automated assistant.
Figure 2B:
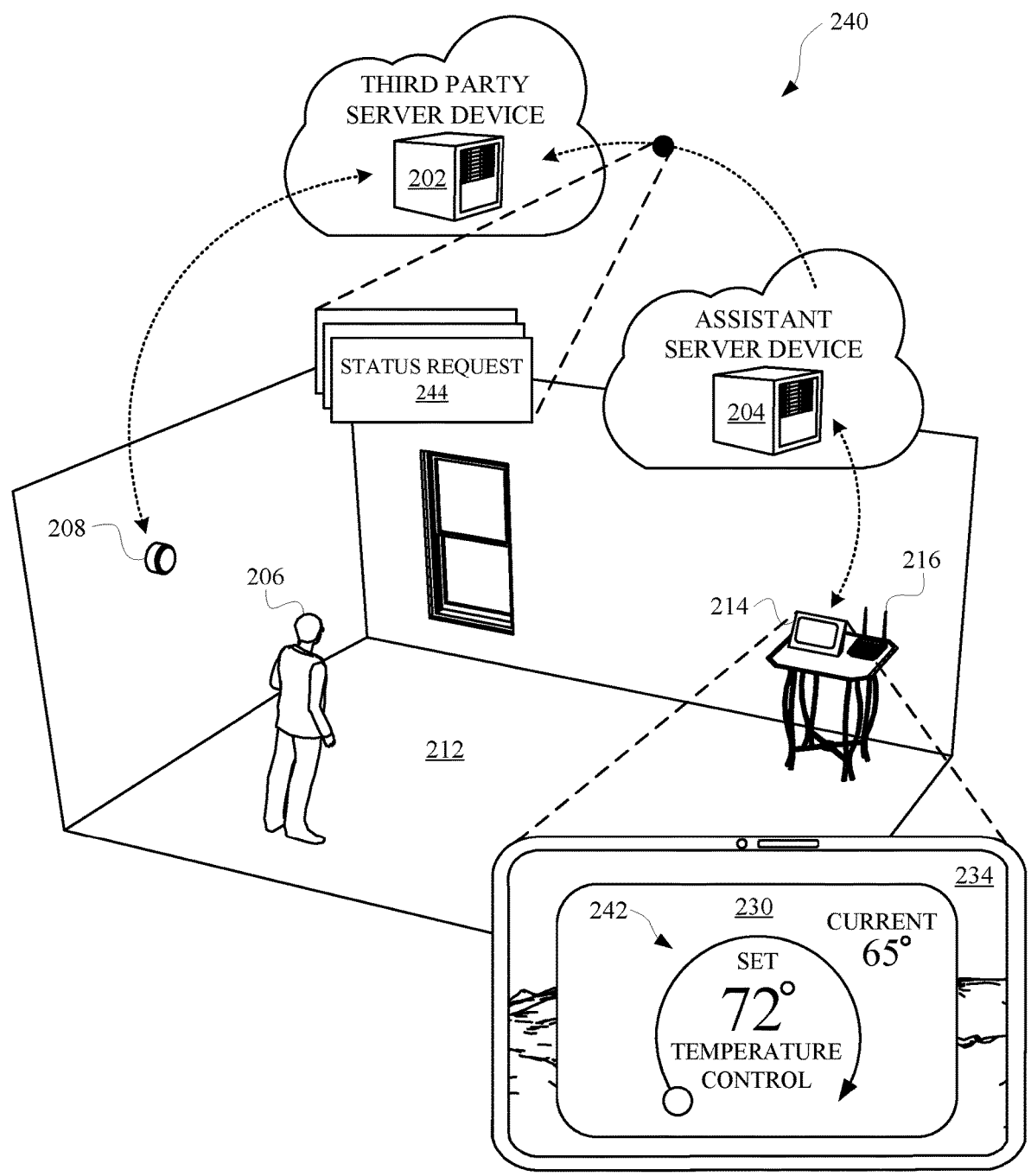

FIG. 2A and FIG. 2B illustrate a view 200 and a view 240, respectively, of an assistant server device 204 adapting to reliability of a third party server device 202 with respect to reporting status changes at a client device 208. A user 206 can control the client device 208 using one or more spoken utterances 238, which can be provided to an automated assistant interface of an assistant device 214. The assistant device 214 can be in communication with the client device 208 via at least local area network, such as a Wi-Fi network provided by a Wi-Fi router 216, and/or a wide area network, such as the internet. In response to receiving the spoken utterance 238, the assistant device 214 can generate audio data, which can characterize the spoken utterance 238, and provide the audio data to the assistant server device 204 for processing. Alternatively, or additionally, the assistant device 214 can locally process the audio data. Processing the audio data can include, for example, converting the audio data to text (or other representation), generating at least natural language understanding (NLU) data from the converted representation, and identifying, based on the NLU data, one or more intent requests that are reflected by the spoken utterance 238.

Based on processing of the audio data by the assistant server device 204, and/or the assistant device 214, the assistant server device 204 can transmit a device request 236 to a third party server device 202. In response to receiving the device request 236, the third party server device 202 can communicate with the client device 208, in furtherance fulfilling one of more requests from the user 206. For example, the spoken utterance 238 can include natural language content such as, "Assistant, please set my thermostat to 72°." Based on this natural language content, the device request 236 can be generated to identify an intent for modifying a setting of the client device 208, and, specifically, modifying a temperature setting of the client device 208, (e.g., a thermostat).

The user 206 can provide the spoken utterance 238 after coming home, entering a room 212 of their home, and seeing a current temperature reading presented at a display panel 234 of the assistant device 214. The assistant device 214 can present an interface 230 of an assistant application, which can provide one or more graphical control elements 232 for controlling one or more settings of the client device 208. Furthermore, the interface 230 can present status data corresponding to the client device 208. For example, prior to the user 206 providing the spoken utterance 238, the interface 230 of the assistant application can indicate that a setting of the client device 208 is set to 65 degrees. This status data can be based on data provided by the third party server device 202 prior to the user providing the spoken utterance 238. The assistant server device 204, and/or the assistant device 214, can determine one or more metrics characterizing a reliability of a third party server device 202 and/or the client device 208 with respect to providing such status data updates. Based on these one or more metrics, the assistance server device 204 and/or the assistant device 214 can determine whether to proactively request status data from the third party server device 202, and/or wait for the third party server device 202 and/or the client device 208 to provide status updates.

In some implementations, one or more metrics can be based on a latency exhibited by the third party server device 202 when reporting a status update after a user has provided a spoken utterance 238. The spoken utterance can be provided in furtherance of controlling the third party client device 208 that is in communication with the third party server device 202. For example, an amount of latency can be based on an amount of time delay between the assistant device 214 receiving the spoken utterance 238 from the user 206 and a time when the assistant device 214 receives a status update corresponding to the spoken utterance 238. Alternatively, or additionally, an amount of latency can be based on a time delay between when the assistant server device 204 provides the device request 236 to the third party server device 202, and when the assistant server device 204 receives status data 242 from the third party server device 202.

In some implementation, one or more metrics characterizing a reliability of a third party server device 202 and/or the client device 208, can be based on one or more measurements of latency, and/or a comparison of latency to one or more reference values. For example, an automated assistant, and/or the assistant server device 204, can interact with a variety of different third party server devices 202 corresponding to a variety of different third party entities. Each third party entity can cause some amount of latency at their respective third party server device and/or their respective client device. A reference value, in some implementations, can characterize an average amount of latency caused by one or more third party entities. Therefore, a metric value can indicate a higher reliability for a particular third party server device that exhibits less latency then the average latency for one or more third party entities. Moreover, another metric value can indicate a lower reliability for a particular third party server device that exhibits more latency than the average latency for one or more third party entities. In some implementations, a reference value can be based on multiple different types of latency properties (e.g., each latency property can characterize one or more different types of interactions involving a third party server device and/or a third party client device, characterize a type(s) of devices, characterize a time of day), or a single type of latency measurement.

When the third party server device 202 corresponds to a metric indicating lower reliability relative to other third party entities, the assistant server device 204 can provide a status request 244 to the third party server device 202 subsequent to providing the device request 236. Alternatively, or additionally, when the third party server device 202 corresponds to a different metric indicating a high reliability relative to other third party entities, the assistant server device 204 can bypass providing the status request 244 to the third party server device 202 subsequent to providing the device request 236. In response to receiving the status request 244, the third party server device 202 can generate updated status data, and provide the status data to the assistant server device 204 and/or the assistant device 214. In response to receiving the updated status data, the assistant server device 204 and/or the assistant device 214 can cause the display panel 234 of the assistant device 214 to render an interface 230 that characterizes the updated status data 242. For instance, because the user 206 previously requested that the temperature setting of the client device 208 be set to 72 degrees, the interface 230 can characterize this most recent setting based on the updated status data received from the third party server device 202. In this way, using such metrics allows the assistant device 214, and/or the assistant server device 204, to determine whether to be proactive about retrieving updated status data, or rely on the third party server device 202 to proactively provide the updated status data.

By operating the assistant server device 204 and/or the assistant device 214 according to one or more metrics characterizing reliability of different third party devices and/or entities, computational resources can be preserved. For example, network bandwidth can be preserved when an assistant server device 204 acknowledges a reliability of a third party server device, and therefore bypasses transmitting frequent status update requests. Furthermore, for those third party entities that may be indicated as unreliable, the assistant server device 204 and/or the assistant device 214 will have more accurate data regarding other client devices, at least by proactively requesting such data. As a result, the assistant server device 204 and/or the assistant device 214 will be able to make more informed decisions about controlling certain client devices. For example, a user may rely on inaccurate data about a status of a client device, and issue a request to the automated assistant in order to modify the status of the client device. As a result, the request may cause the assistant device 214 to implement instructions that cause a particular client device to operate inefficiently, perform redundant operations, and/or otherwise waste power and/or other computational resources. Such wasteful operations can be eliminated by employing the implementations provided herein.

Figure 3:
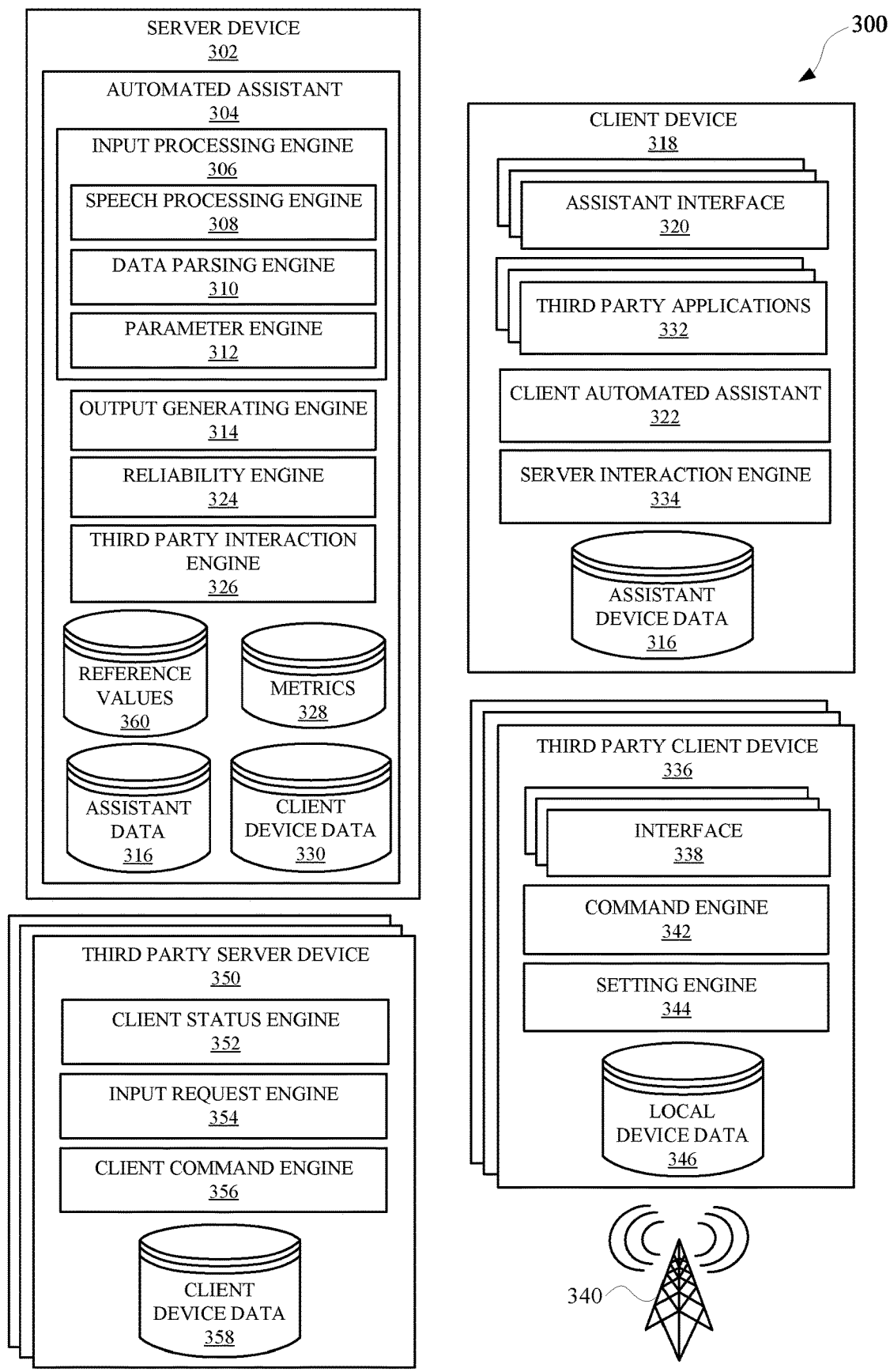
FIG. 3 illustrates a system for characterizing reliability of various different third party servers, at least when reporting third party device statuses, as well as adapting protocols for device ecosystems affected by such reliability.

FIG. 3 illustrates a system 300 for characterizing reliability of various different third party servers, at least when reporting third party device statuses to an automated assistant 304, as well as adapting protocols for device ecosystems affected by such reliability. The automated assistant 304 can operate as part of an assistant application that is provided at one or more computing devices, such as a client device 318 and/or a server device 302. A user can interact with the automated assistant 304 via an assistant interface, which can be a microphone, a camera, a touch screen display, a user interface, and/or any other apparatus capable of providing an interface between a user and an application. For instance, a user can initialize the automated assistant 304 by providing a verbal, textual, and/or a graphical input to an assistant interface 320 to cause the automated assistant 304 to perform a function (e.g., provide data, control a peripheral device, access an agent, generate an input and/or an output, etc.). The client device 318 can include a display device, which can be a display panel that includes a touch interface for receiving touch inputs and/or gestures for allowing a user to control applications of the client device 318 via the touch interface. In some implementations, the client device 318 can lack a display device, thereby providing an audible user interface output, without providing a graphical user interface output. Furthermore, the client device 318 can provide a user interface, such as a microphone, for receiving spoken natural language inputs from a user. In some implementations, the client device 318 can include a touch interface and can be void of a camera, but can optionally include one or more other sensors.

The client device 318 and/or other third party client devices 318 can be in communication with the server device 302 over a network 340, such as the internet. Additionally, the client device 318 and the other computing devices 434 can be in communication with each other over a local area network (LAN), such as a Wi-Fi network. The client device 318 can offload computational tasks to the server device 302 in order to conserve computational resources at the client device 318. For instance, the server device 302 can host the automated assistant 304, and client device 318 can transmit inputs received at one or more assistant interfaces 320 to the server device 302. However, in some implementations, the automated assistant 304 can be hosted at the client device 318 as a client automated assistant 322.

In various implementations, all or less than all aspects of the automated assistant 304 can be implemented on the client device 318. In some of those implementations, aspects of the automated assistant 304 are implemented via the client automated assistant 322 of the client device 318 and can interface with the server device 302, which can implement other aspects of the automated assistant 304. The server device 302 can optionally serve a plurality of users and their associated assistant applications via multiple threads. In implementations where all or less than all aspects of the automated assistant 304 are implemented via a client automated assistant 322 at the client device 318, the client automated assistant 322 can be an application that is separate from an operating system of the client device 318 (e.g., installed "on top" of the operating system)—or can alternatively be implemented directly by the operating system of the client device 318 (e.g., considered an application of, but integral with, the operating system).

In some implementations, the automated assistant 304 and/or the client automated assistant 322 can include an input processing engine 306, which can employ multiple different modules for processing inputs and/or outputs for the client device 318 and/or the server device 302. For instance, the input processing engine 306 can include a speech processing engine 308, which can process audio data received at an assistant interface 320 to identify the text embodied in the audio data. The audio data can be transmitted from, for example, the client device 318 to the server device 302 in order to preserve computational resources at the client device 318.

The process for converting the audio data to text can include a speech recognition algorithm, which can employ neural networks, and/or statistical models for identifying groups of audio data corresponding to words or phrases. The text converted from the audio data can parsed by a data parsing engine 310 and made available to the automated assistant as textual data that can be used to generate and/or identify command phrase(s), intent(s), action(s), slot value(s), and/or any other content specified by the user. In some implementations, output data provided by the data parsing engine 310 can be provided to a parameter module 312 to determine whether the user provided an input that corresponds to a particular intent, action, and/or routine capable of being performed by the automated assistant 304 and/or an application or agent that is capable of being accessed via the automated assistant 304. For example, assistant data 316 can be stored at the server device 302 and/or the client device 318 as assistant device data 316, and can include data that defines one or more actions capable of being performed by the automated assistant 304 and/or client automated assistant 322, as well as parameters necessary to perform the actions.

In some implementations, the server device 302, the automated assistant 304, and/or the client device 318 can track reliability of a third party server device 350 and/or the third party client device 336. Specifically, reliability of a third party server device 350 and/or the third party client device 336 can be tracked with respect to latency when reporting status updates, accuracy of particular status updates, and/or any other characteristic that can be indicative of reliability of a server device and/or a client device. For example, a user can provide an input to an assistant interface 320, which can cause the automated assistant 304 to provide an output via an output generating engine 314. The output can be based on data provided by the parameter engine 312, which can process the input from the user. The output can be provided to a third party server device 315 in order to influence an operation and/or a setting of a third party client device 336. For example, the third party client device 336 can be one of multiple third party client devices connected within a home of the user, or otherwise associated with the user. The user can control third party client devices 336 via the automated assistant 304, by permitting the automated assistant 304 to communicate with the third party client devices 336 and/or the third party server device 350. The output from the output generating engine 314 can be provided to the third party server device 350. For example, the output from the server device 302 can characterize an intent requested by the user, such as an alarm system control intent. An input request engine 354 can receive the output from the server device 302, and determine that the output has been provided by the server device 302, and that the output is based on an input from a particular user interacting with their respective automated assistant. Furthermore, a client command engine 356 can generate one or more client commands based on the output of the server device 302. Based on one or more processes of the input request engine 354 and/or the client command engine 356, the third party server device 350 can transmit one or more commands to the third party client device 336, which the user intended to control with their input. When the third party client device 336 receives the one or more commands, a command engine 342 of the third party client device 336 can process the one more commands. Command data can be generated by a command engine 342 and used by a setting engine 344 to determine one or more settings, and/or one or more operations, to modify according to the one or more commands. Any changes to settings, operations, and/or any other feature of the third party client device 336 can be characterized in status data that is stored as local device data 346. When the status data has been generated at the third party client device 336, the third party client device 336 can confirm completion of execution of the one more commands for the third party server device 350.

In some implementations, when the third party server device 350 transmits one or more commands to the third party client device 336 based on the input from the user to the automated assistant, the third party server device 350 can also transmit confirmation to the server device 302 and/or the client device 318. The confirmation can indicate to the server device 302 and/or client device 318 that the third party server device 350 has acknowledged the input from the user and has acted on the input from the user. Thereafter, the third party server device 315 can determine that the third party client device 336 has executed the one more commands successfully and, in response to determining that the third party client device 336 has executed the one or more commands successfully, the third party server device 350 can update any client device data 358, in order to characterize an updated operating status of the third party client device 336. Furthermore, depending on the third party entity that is responsible for the third party server device 350, the third party server device 250 may send status data to the server device 302. However, different third party server devices may provide such status updates according to a variety of different protocols.

In some implementations, a third party server device 350 can operate according to a protocol in which a client status engine 352 of the third party server device 350 provides requests for confirmation that certain commands were executed by a third party client device 336. Based on such confirmations from the third party client device 336, the client status engine 352 can generate various sets of status data, which can be stored as client device data 358 at the third party server device 350. However, a third party server device 350 may operate according to, or fail to operate according to, another protocol for providing status updates to other interested parties, such as the server device 302, the automated assistant 304, and/or the client device 318.

A third party interaction engine 326 of the server device 302 can collect various data about various different third party server devices 350 in furtherance of eliminating status inaccuracies and/or delays being exhibited at the client device 318. For example, temporal data corresponding to interactions between the server device 302 and the third party server devices 350 can be collected by the third party interaction engine 326. The third party interaction engine 326 can identify specific times when a request is transmitted from the server device 302, when a request is received at a client device 318 from a user, when a request is received at the server device 302 from the client device 318, when the third party server device 350 receives instructions from the server device 302, when the third party server device 350 sends command data to one or more third party client devices 336, when one or more third party client devices 336 confirm receipt of the command data to the third party server device 350, when the third party server device 350 provides a confirmation of receipt of instructions from the server device 302, when a third party server device 350 requests a status update from a third party client device 336, when a third party server device 350 receives status data from a third party client device 336, when the server device 302 receives client status data from the third party server device 250, and/or any other temporal feature that can characterize a transaction occurring with respect to at least one device.

The server device 302 can include a reliability engine 324 that can use temporal data generated by the third party interaction engine 326 in order to generate one or more metrics 328 based on one or more temporal features of any transaction discussed herein. The one or more metrics can characterize a reliability of one or more third party server devices 350, at least with respect to proactively providing status updates to the automated assistant 304, the server device 302, and/or the client device 318. Furthermore, the third party interaction engine 326 can use one or more metrics 328 to make decisions about whether and/or how to interact with a particular third party server device 350. For example, in response to determining that the user provided a request to change an operating setting of a third party client device 336, the server device 302 can determine whether to immediately query the third party server device 350 after communicating the user request to the third party server device 350, or wait for the third party server device 350 to provide updated status data corresponding to the third party client device 336.

In some implementations, the reliability engine 324 can determine and/or generate one or more reference values 360, with which the third party interaction engine 326 can compare the metrics 328. The reference value 360 can be based on one or more transactions corresponding to a third party server device 350 and/or a third party client device 336. Furthermore, a reference value 360 can indicate a reliability of a particular third party entity, at least with respect to how reliable a third party entity is in employing services that proactively report status changes of server devices and/or client devices. In some implementations, a reference value and/or a metric can characterize a reliability of multiple different third party entities, the reliability of multiple different third party servers, a reliability of multiple different third party client devices, a reliability of certain types of client devices, a reliability of certain types of third party entities, and/or any other third party entities and/or devices capable of interacting with an automated assistant.

As an example, and in some implementations, a reference value can characterize on average amount of latency exhibited by one or more different third party server devices when reporting a client device status update subsequent to fulfilling a user request to an automated assistant. In other words, at least one reference value of the reference values 360, for instance, 1 hour, when an average latency of multiple different third party server devices 350 is 1 hour. Therefore, when an automated assistant is interacting with a third party server device 350 associated with a third party entity, the third party interaction engine 326 can access a metric corresponding to that third party entity and compare the metric to the reference value. When the metric corresponds to an amount of latency that is less than the reference value or average value, the third party interaction engine 326 can bypass proactively querying the third party server device 350 for a client device status update. However, when the metric corresponds to an amount of latency that is greater than the reference value or average value, a third party interaction engine 326 can proactively query the third party server device 350 for a client device status update. It should be noted that the reference value can correspond to amount of time that is less than or greater than any number of microseconds, milliseconds, seconds, hours, days, and/or any other units of time. For example, a reference value can be, but is not limited to, 500 milliseconds, and therefore comparison of metrics to this particular reference can provide a basis from which to query a third party server device 350 for status update, or bypass providing a query to third party server device 350 for the status update.

Figure 4:
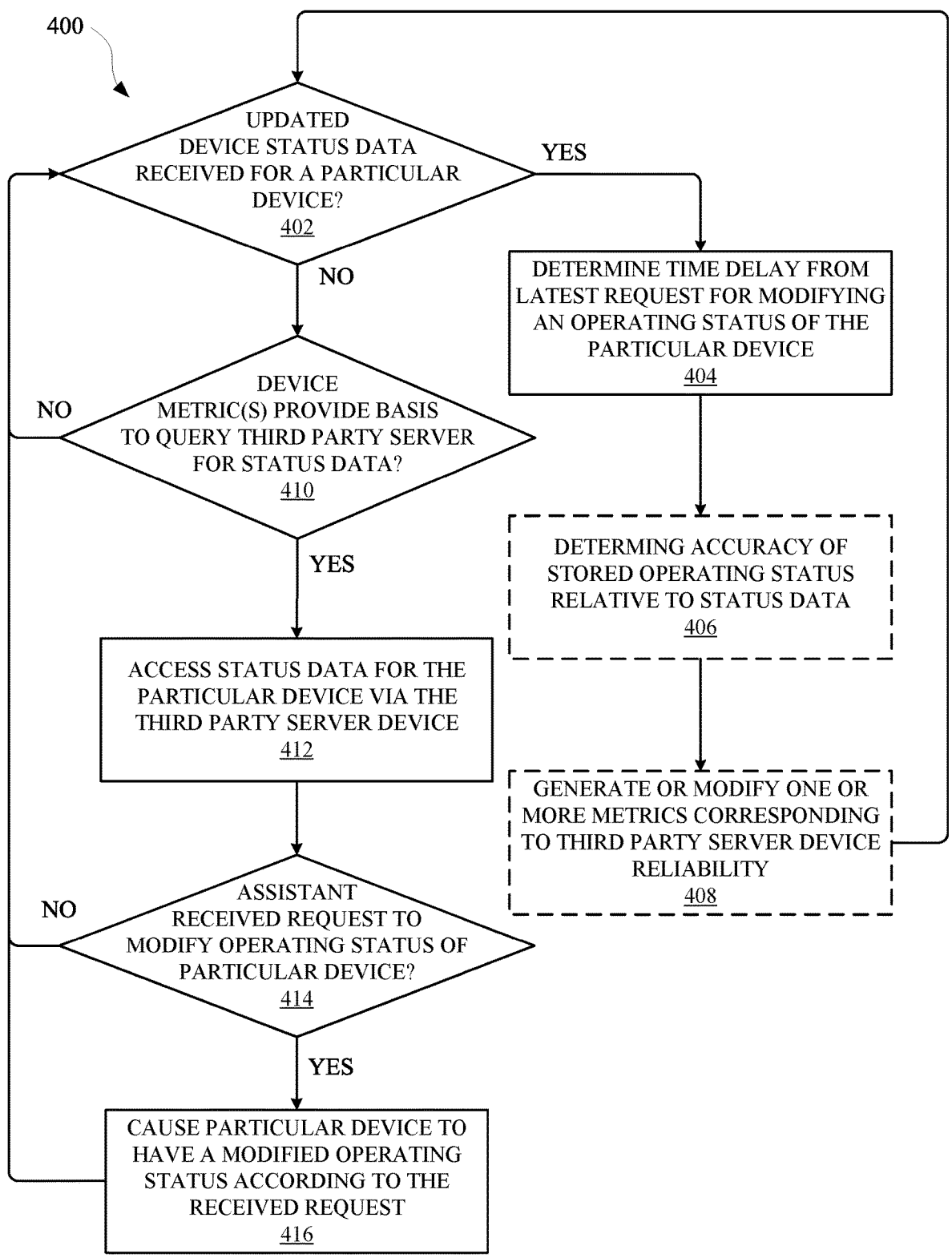
FIG. 4 illustrates a method for determining whether to query a third party server for a status update, corresponding to a particular third party client device, based on one or more metrics.

FIG. 4 illustrates a method 400 for determining whether to query a third party server for a status update, corresponding to a particular third party client device, based on one or more metrics. The method 400 can be performed by one or more computing devices, applications, and/or any other apparatus or module capable of interacting with a third party server device and/or a third party client device. The method 400 can include an operation 402 of determining whether updated device status data has been received for a particular device. When updated device status data has been received for a particular device, the method 400 can proceed from the operation 402 to the operation 404. The operation 404 can include determining a time delay or the amount of time from a latest request for modifying an operation status of a particular device. In other words, the operation 404 can include determining the time period between a time when the updated device status data was received for that particular device and a time when a latest request for modifying the operating status of the particular device was provided to a third party server device, a particular client device, and/or any other associated device.

The method 400 can further include an optional operation 406 of determining an accuracy of a stored operating status relative to the updated status data. The optional operation 406 can be determined periodically by a server device and/or a client device that is in communication with the third party server device and/or the third party client device. In some implementations, the optional operation 406 can be determined randomly, and/or in response to a request for devices statuses from a user, in order to gauge how reliable a particular third party server device is with respect to being proactive about providing status updates. For example, a user may have modified and/or initialized an operation of a third party client device using an interface of the third party client device, or a third party application corresponding to the third party client device. Depending on how proactive the third party entity is with respect to providing status updates, an automated assistant or assistant related device may or may not receive any status update regarding the actions of the user. Therefore, if the server device checks the status of the third party client device, and the status indicated by the third party server device is different than the status stored at the server device, the server device can generate data to characterize this inaccuracy of device status.

Furthermore, if the server device checks the status of the third party client device, and the status indicated by the third party server device is the same as the status stored at the server device, the server device can capture this accuracy also using data. In this way, the server device and/or the client device, can characterize a probability that status data stored by the server device and/or the client device for a particular third party client device is accurate at any given time. Therefore, if the server device determines that there is a high probability that status data for a particular third party client device is accurate, and a user requests that the third party client device operate according to the same status data, the server device can bypass requesting the third party server device to modify an operation of the third party client device. As a result, this can save network bandwidth and computational resources, as many inconsequential or otherwise unnecessary transactions between clients and servers would be avoided.

However, if the server device determines that there is a low probability that status data for a particular third party client device is accurate, and the server device receives a request from a user to operate the third party client device according to the same particular status data, then, despite the server device being under the impression that the third party client device is already operating as the user has requested, the server device can, regardless, communicate the request to the third party server device. In response, the third party server device can process the request and indicate that the third party client device is already operating according to the same particular status data. Alternatively, in response, when the third party client device is not already operating according to the same particular status data stored by the server device, the third party server device can process the request and cause the third party client device to operate in furtherance of fulfilling the request from the user.

The method 400 can further include an operation 408 of generating and/or modifying one or more metrics corresponding to third party server device reliability. The one or more metrics can be based on the time delay and/or time period determined at the operation 404, and/or the accuracy determined at the optional operation 406. In other words, in some implementations, the one or more metrics can be based on an amount of latency exhibited by one or more third party server devices and/or an accuracy determined for a particular third party server device. In some implementations, a metric can be one or more different values selected from a range of different values. Alternatively, or additionally, a metric can be a discrete value, such as a 1 or a 0. For example, the metric can be defined as 1 when the time delay is greater than equal to, or less than a particular reference value. Furthermore, the metric can be defined as 0 when the time delay is less than, equal to, or greater than the particular reference value or values. In one non-limiting example, the metric can be assigned 1 when the time delay is 2 seconds, and the reference value is 5 seconds (i.e., when the time delay is less than the reference value). Alternatively, in another non-limiting example, the metric can be assigned as 0 when the time delay is 7 seconds and the reference value is 5 seconds (i.e., when the time delay is more than the reference value).

In some implementations, the one or more metrics can be based on data generated at operation 406 and/or operation 404, and/or any other data that can indicate reliability of a third party server device. The one or more metrics can be selected from a range of different values, and can optionally be based on one or more reference values. In some implementations, the one or more metrics can be discrete or binary values, such as a 1 or a 0, indicating that a third party server device, that is responsible for providing status data regarding one or more third party client devices, is reliable or not reliable with respect to proactively providing status data. In some implementations, the one or more metrics can be used to determine whether to query a particular third party server device for updated status data.

The method 400 can proceed from the operation 408 to the operation 402, in order to determine whether any further updated device status data has been received for a particular device. When, at the operation 402, no updated status data has been received for a particular device at a given time, the method 400 can proceed from the operation 402 to the operation 410. The operation 410 can include determining whether one or more device metrics provide a basis to query a third party server device for status data regarding the particular device. For example, one or more metrics can be compared to one or more reference values in order to determine whether there is a basis for providing a query to the third party server device for status data. In some implementations, one or more metrics can be processed to determine whether the one or more metrics satisfy a particular threshold, and/or whether the one or more metrics are greater than, equal to, and/or or less than one or more particular reference values. When the one or more metrics provide no basis from which to query the third party server device for status data, the method 400 can proceed from the operation 410 to the operation 402. Alternatively, when the one or metrics do provide a basis for providing a query to the third party server device for status data, the method 400 can proceed from the operation 410 to the operation 412. By completing the method 400, at least operations 402, 410, and 412, an assistant server and/or an assistant device can determine whether and/or when to query a third party server device for updated operational status data for a client device, at least when an operational status update has not been received for a particular period of time.

The operation 412 can include an operation of accessing status data for the particular device via the third party server device. In order to access the status data, the server device can transmit a request to the third party server device, and in response, the third party server device can provide status data back to the requesting server device and/or a corresponding client device. The method 400 further include an operation 414 of determining whether an automated assistant has received a request to modify an operating status of the particular device. When the automated assistant has not received a request to modify an operating status of the particular device, the method 400 can proceed from the operation 414 to the operation 402. However, when the assistant has received a request to modify an operating status of the particular device, the method 400 can proceed from the operation 414 to the operation 416. The operation 416 can include causing the particular device to have a modified operating status according to the request received by the automated assistant. Furthermore, the method 400 can proceed from the operation 416 to the operation 402, in which a determination is made as to whether updated status data has been received for the particular device affected by the request from the operation 414 and/or the operation 416.

The reliability of the third party server device may be determined to vary over time, for example by exhibiting reliability patterns corresponding to the time of day or day of the week. For example, a time delay associated with a particular third party server may be determined, using the techniques described herein, to be larger during evenings/mornings and/or weekends than at other times of day (or larger for other times of the day than other times such as evenings/mornings and/or weekends). On the basis of these determinations, a first party server device can modify its behavior with regard to proactively seeking operational status updates for particular third party client devices associated with the third party server. At times of the day/days of the week at which the third party server is determined to be satisfactorily reliable in proactively providing status updates, the first party server may reduce (or eliminate) its proactivity in requesting status updates from the third party server. Correspondingly, at times of the day/days of the week at which the third party server is determined to be less than satisfactorily reliable in proactively providing status updates, the first party server may increase its proactivity in requesting status updates from the third party server. This may contribute to the first party server being efficient in terms of its usage of network resources and computing resources at the first and third party servers, whilst also maintaining accurate information at the first party server with regard to internal operational states of one or more third party client devices associated with the third party server.

Figure 5:
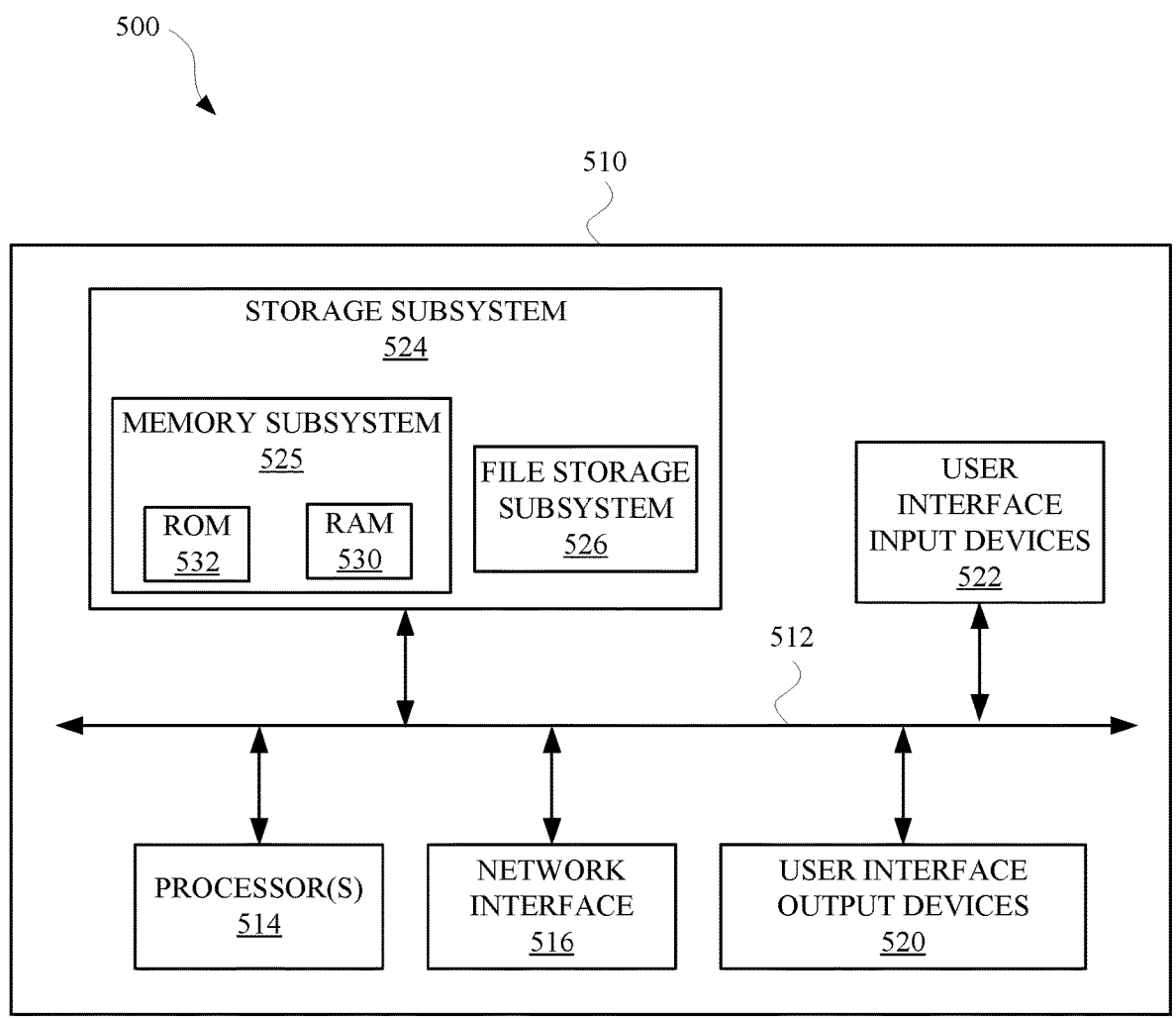
FIG. 5 is a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, and/or to implement one or more of third party server device 102, assistant server device 104, third party application 120, assistant device 114, client device 110, third party server device 202, assistant server device 204, assistant device 214, server device 302, client device 318, third party server device 350, and/or third party client device 336.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is set forth as including operation such as receiving, from a third party server device, first status data indicating a status of a third party client device that is controllable via an assistant device, wherein the assistant device includes an automated assistant interface via which the user interacts with an automated assistant in order to control the third party client device. The method can further include determining, based on receiving the first status data, a metric that is based on an amount of time delay between receiving the first status data and a previous time associated with a request for modifying an operating status of the third party client device. The method can further include, subsequent to determining the metric that is based on the amount of time delay: determining whether to provide a status request to the third party server device for retrieving second status data indicating a current status of the third party client device. The method can further include, when the metric indicates at least some basis to not query the third party server device for the current operating status of the third party client device: bypassing, based on the metric, providing the status request to the third party server device. The method can further include when the metric indicates at least some basis to query the third party server device for the current operating status of the third party client device: providing, based on the metric, the status request to the third party server device, and receiving, in response to the third party server device receiving the status request, the second status data, which characterizes the current operating status of the third party client device.

In some implementations, the method can further include subsequent to determining the metric that is based on the amount of time delay: determining that a user has provided a gesture to an interface of the assistant device, or another client device, in furtherance of controlling the third party client device, wherein determining whether to provide the status request is based on determining that the user provided the gesture to the interface in furtherance of controlling the third party client device. In some implementations, the gesture is tactile gesture and/or a spoken utterance, and the interface includes a touch display panel and/or a microphone. In some implementations, the method can further include generating, in response to receiving the second status data, output data representative of the current operating status of the third party client device; and causing the output data to be rendered via the assistant device, or another client device. In some implementations, determining the metric that is based on the amount of time delay includes: modifying a previously generated metric based on the amount of time delay between receiving the first status data and the previous time associated with the status of the third party client device.

In some implementations, modifying the previously generated metric based on the amount of time delay includes adapting the previously generated metric to limit the basis from which to query the third party server device, for the current operating status of the third party client device, when the amount of time delay is less than a reference amount of time delay. In some implementations, modifying the previously generated metric based on the amount of time delay includes adapting the previously generated metric to expand the basis from which to query the third party server device, for the current operating status of a third party client device, when the amount of time delay is greater than the reference amount of time delay. In some implementations, the reference value is based on time values corresponding to other requests, from one or more other users, to other third party server devices in furtherance of modifying operating statuses of other third party client devices. In some implementations, determining the metric includes: accessing metric data that characterizes the metric and other metrics, and the assistant device is in communication with multiple other third party client devices, and one or more client devices of the multiple other third party client devices are correlated to at least one other metric of the other metrics.

In some implementations, the request is based on a spoken utterance provided by a user to the automated assistant interface, and natural language content of the spoken utterance identifies an automated assistant routine corresponding to multiple different actions, and the multiple different actions include an action for causing the status of the third party client device to transition into the current operating status. In some implementations, determining the metric includes accessing another metric that is based on whether the third party server device has previously provided a status update to the automated assistant in response to the user requesting a status change of the third party client device via a third party hardware interface, and/or a third party application, that is in communication with the third party client device. In some implementations, the other metric is further based on another amount of time between the user interacting with the third party hardware interface, and/or the third party application, and the third party server device providing the status update to the automated assistant and/or the assistant device. In some implementations, determining whether to query the third party server device for the indication of the current operating status of the third party client device is further based on the other metric, and the third party server device is at least partially controlled by a third party entity that is different from an entity that at least partially controls the automated assistant.

In some implementations, the metric and/or the other metric is based on interactions between one or more other users and one or more other third party client devices that are in communication with the third party server device. In some implementations, the one or more other third party client devices are: different from the third party client device, and connected to separate networks from a network that the third party client device is connected. In some implementations, the request is received by the third party server device in response to the user interacting with a third party application that controls the third party client device, and/or the third party server device. In some implementations, the method can further include generating, in response to receiving the second status data, a graphical user interface element representative of the current operating status of the third party client device; and causing a graphical user interface of the assistant device, or another client device, to render the graphical user interface element. In some implementations, the metric is based on a particular time delay between a first request, originating at the third party server device, to change the operating status of the client device, and a second request from the automated assistant for a current status. In some implementations, the request identifies at least one action for the automated assistant, and the at least one action includes an action for causing the status of the third party client device to transition into the current operating status.

In some implementations, a method implemented by one or more processors is set forth as including operation such as determining, based on processing audio data corresponding to a spoken utterance, that a user has requested that an automated assistant cause a modification to an operational status of a client device. In some implementations, the method can further include providing, in response to determining that the user has requested that the automated assistant cause the modification to the operational status of the client device, a request to a server device and/or the client device to effectuate the modification to the operational status of the client device. In some implementations, the method can further include receiving, based on providing the request to the server device and/or the client device, first status data from the server device and/or the client device, wherein the first status data characterizes a modified operational status of the client device. In some implementations, the method can further include determining, based on receiving the first status data, an amount of time delay that characterizes a time period between determining that the user has requested that the automated assistant cause the modification to the operational status of the client device, and receiving the first status data from the server device and/or the client device. In some implementations, the method can further include, subsequent to determining the amount of time delay: determining that the user has subsequently requested the automated assistant to cause a particular modification to a current operational status of the client device. In some implementations, the method can further include providing, in response to determining that the user has subsequently requested the automated assistant to cause the particular modification to the current operational status of the client device, another request to the server device and/or the client device to effectuate the particular modification to the current operational status of the client device. In some implementations, the method can further include determining, based on the amount of time delay and in response to determining that the user has requested that the automated assistant cause the particular modification to the current operational status of the client device, whether the amount of time delay indicates at least some basis to query the server device and/or the client device for second status data. In some implementations, the method can further include, when the amount of time delay indicates at least some basis to not query the server device and/or the client device for the second status data: bypassing, based on the amount of time delay, providing a status request to the server device and/or the client device. In some implementations, the method can further include, when the amount of time delay indicates at least some basis to query the server device and/or the client device for the second status data: providing, based on the amount of time delay, the status request to the server device and/or the client device, and receiving, in response to the server device and/or the client device receiving the status request, the second status data, which characterizes an operational status update for the client device.

In some implementations, the method can further include, subsequent to determining the amount of time delay: causing a user interface of a separate client device to provide content that characterizes the current operational status of the client device. In some implementations, the user interface of the separate client device is a display panel and provides graphical content that characterizes the current operational status of the client device. In some implementations, the method can further include, when the amount of time delay indicates at least some basis to query the server device and/or the client device for the second status data: causing the display panel to render other graphical content that characterizes the operational status update for the client device. In some implementations, the amount of time delay characterizes a particular time period between: providing the request to the server device and/or the client device to effectuate the modification to the operational status of the client device, and receiving the first status data from the server device and/or the client device.

In some implementations, a method implemented by one or more processors is set forth as including operation such as causing a client device to render content that characterizes a first status of another client device, wherein the client device and the other client device are connected to a common local area network, and the other client device is controlled using at least an automated assistant that is accessible via the client device. In some implementations, the method can further include determining, subsequent to causing the client device to render the content, that the client device has received a command for causing the other client device to operate according to a second status. In some implementations, the method can further include providing, in response to determining that the client device has received the command to cause the other client device to operate according to the second status, a request to a third party server device to cause the other client device to operate according to the second status. In some implementations, the method can further include receiving, subsequent to the request transmitted to the third party server device, status data from the third party server device, wherein the status data characterizes an operational status of the other client device. In some implementations, the method can further include, when the status data indicates that the client device is operating according to the second status: modifying, or bypassing modifying, one or more metrics to characterize the server device as being reliable with respect to providing accurate status data, at least in response to the server device causing the other client device to exhibit any modified status relative to any previous status of the other client device. In some implementations, the method can further include, when the status data indicates that the client device is not operating according to the second status: modifying, or generating, the one or more metrics to indicate that the server device is unreliable with respect to providing the accurate status data, at least in response to the server device causing the other client device to exhibit any modified status relative to any previous status of the other client device.

In some implementations, wherein modifying, or generating, the one or more metrics to indicate that the server device is unreliable with respect to providing the accurate status data includes: modifying, or generating, the one or more metrics to indicate a basis for pro-actively querying the server device in response to determining that a subsequent command is received for causing the other client device to operate according to a particular status. In some implementations, the method can further include modifying, or bypassing modifying, one or more metrics to characterize the server device as being reliable with respect to providing accurate status data includes: modifying, or bypassing modifying, the one or more metrics to indicate a basis for bypassing pro-actively querying the server device in response to determining that a subsequent command is received for causing the other client device to operate according to a particular status. In some implementations, causing the client device to render content that characterizes the first status of the other client device includes causing a graphical user interface of the client device to render one or more graphical elements at the graphical user interface.

In some implementations, the method can further include determining a type of device that characterizes the other client device, wherein modifying or generating the one or more metrics is based on the type of device that characterizes the other client device. In some implementations, the method can further include determining a particular time that the request was provided to the third party server device, wherein modifying or generating the one or more metrics is based on the particular time that the request was provided to the third party server device. In some implementations, determining that the client device has received the command includes determining a type of command for causing the other client device to operate according to the second status, wherein modifying or generating the one or more metrics is based on the type of command. In some implementations, determining type of command includes determining whether the command was initialized via the automated assistant, a particular interface of the other client device, or a separate interface of a peripheral device that is associated with the other client device.

In some implementations, a method implemented by one or more processors is set forth as including operation such as causing a client device to store status data that characterizes a status of another client device, wherein the client device and the other client device are connected to a common local area network, and the other client device is controlled using at least an automated assistant that is accessible via the client device. The method can further include providing, subsequent to storing the status data at the client device, a server request to a server device to determine a current operating status of the other client device. In some implementations, the method can further include providing, subsequent to storing the status data at the client device, a client request to the other client device to determine the current operating status of the other client device. In some implementations, the method can further include receiving, based on the server request transmitted to the server device, server status data from the server device, wherein the server status data characterizes a particular status of the other client as indicated by the server device. In some implementations, the method can further include receiving, based on the client request transmitted to the other client device, client status data from the other client device, wherein the client status data characterizes another particular status of the other client as indicated by the other client device. In some implementations, the method can further include, when the server status data and the client status data indicate a common operating status for the other client device: causing the client device to store updated status data characterizing the common operating status for the other client device.

In some implementations, the method can further include, when the server status data and the client status data indicate the common operating status for the other client device: modifying, or bypassing modifying, one or more metrics to characterize the server device as being reliable with respect to providing accurate status data. In some implementations, the method can further include, when the server status data and the client status data fail to indicate the common operating status for the other client device: causing the client device to store other updated status data characterizing the other particular status of the other client, as indicated by the other client device. In some implementations, the method can further include, when the server status data and the client status data fail to indicate the common operating status for the other client device: modifying, or generating, the one or more metrics to indicate that the server device is unreliable with respect to providing the accurate status data. In some implementations, the method can further include determining a type of device that characterizes the other client device, wherein modifying or generating the one or more metrics is based on the type of device that characterizes the other client device. In some implementations, the method can further include determining a particular time that the server request was provided to the server device, wherein modifying or generating the one or more metrics is based on the particular time that the server request was provided to the server device. In some implementations, the method can further include determining an amount of time between a first time stamp corresponding to the status of the other client device, and a second time stamp corresponding to the server status data received from the server device.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

I claim:

1. A method implemented by one or more processors, the method comprising:
   receiving, from a third party server device, first status data indicating a status of a third party client device that is controllable via an assistant device, wherein the assistant device includes an automated assistant interface via which a user interacts with an automated assistant in order to control the third party client device;
   determining, based on receiving the first status data, a metric that is based on an amount of time delay between receiving the first status data and a previous time associated with a request for modifying an operating status of the third party client device;
   subsequent to determining the metric that is based on the amount of time delay:
   determining whether to provide a status request to the third party server device for retrieving second status data indicating a current operating status of the third party client device;
   when the metric indicates at least some basis to not query the third party server device for the current operating status of the third party client device:
      bypassing, based on the metric, providing the status request to the third party server device; and
   when the metric indicates at least some basis to query the third party server device for the current operating status of the third party client device:
      providing, based on the metric, the status request to the third party server device, and
      receiving, in response to the third party server device receiving the status request, the second status data, which characterizes the current operating status of the third party client device.

2. The method of claim 1, further comprising:
   subsequent to determining the metric that is based on the amount of time delay:
   determining that a user has provided a gesture to an interface of the assistant device, or another client device, in furtherance of controlling the third party client device, wherein determining whether to provide the status request is based on determining that the user provided the gesture to the interface in furtherance of controlling the third party client device.

3. The method of claim 1, further comprising:
   generating, in response to receiving the second status data, output data representative of the current operating status of the third party client device; and
   causing the output data to be rendered via the assistant device, or another client device.

4. The method of claim 1, wherein determining the metric that is based on the amount of time delay includes:
   modifying a previously generated metric based on the amount of time delay between receiving the first status data and the previous time associated with the status of the third party client device.

5. The method of claim 4, wherein modifying the previously generated metric based on the amount of time delay includes adapting the previously generated metric to limit a basis from which to query the third party server device, for the current operating status of the third party client device, when the amount of time delay is less than a reference amount of time delay.

6. The method of claim 5, wherein modifying the previously generated metric based on the amount of time delay includes adapting the previously generated metric to expand the basis from which to query the third party server device, for the current operating status of the third party client device, when the amount of time delay is greater than the reference amount of time delay.

7. The method of claim 6, wherein the reference amount of time delay is based on time values corresponding to other requests, from one or more other users, to other third party server devices in furtherance of modifying operating statuses of other third party client devices.

8. The method of claim 1,
   wherein determining the metric includes: accessing metric data that characterizes the metric and other metrics, and
   wherein the assistant device is in communication with multiple other third party client devices, and one or more client devices of the multiple other third party client devices are correlated to at least one other metric of the other metrics.

9. The method of claim 1,
   wherein the request is based on a spoken utterance provided by a user to the automated assistant interface, and natural language content of the spoken utterance identifies an automated assistant routine corresponding to multiple different actions, and
   wherein the multiple different actions include an action for causing the status of the third party client device to transition into the current operating status.

10. The method of claim 1, further comprising:
    wherein determining the metric includes accessing another metric that is based on whether the third party server device has previously provided a status update to the automated assistant in response to the user requesting a status change of the third party client device via a third party hardware interface, and/or a third party application, that is in communication with the third party client device.

11. The method of claim 10, wherein the other metric is further based on another amount of time between the user interacting with the third party hardware interface, and/or the third party application, and the third party server device providing the status update to the automated assistant and/or the assistant device.

12. The method of claim 10,
    wherein determining whether to provide the status request to the third party server device is further based on the other metric, and
    wherein the third party server device is at least partially controlled by a third party entity that is different from an entity that at least partially controls the automated assistant.

13. The method of claim 1, wherein the metric and/or the other metric is based on interactions between one or more other users and one or more other third party client devices that are in communication with the third party server device.

14. The method of claim 1,
    wherein the request is received by the third party server device in response to the user interacting with a third party application that controls the third party client device, and/or the third party server device.

15. The method of claim 1, further comprising:
generating, in response to receiving the second status data, a graphical user interface element representative of the current operating status of the third party client device; and
causing a graphical user interface of the assistant device, or another client device, to render the graphical user interface element.

16. The method of claim 1, wherein the metric is based on a particular time delay between a first request, originating at the third party server device, to change the operating status of the client device, and a second request from the automated assistant for a current status.

17. A method implemented by one or more processors, the method comprising:
determining, based on processing audio data corresponding to a spoken utterance, that a user has requested that an automated assistant cause a modification to an operational status of a client device;
providing, in response to determining that the user has requested that the automated assistant cause the modification to the operational status of the client device, a request to a server device and/or the client device to effectuate the modification to the operational status of the client device;
receiving, based on providing the request to the server device and/or the client device, first status data from the server device and/or the client device, wherein the first status data characterizes a modified operational status of the client device;
determining, based on receiving the first status data, an amount of time delay that characterizes a time period between determining that the user has requested that the automated assistant cause the modification to the operational status of the client device, and receiving the first status data from the server device and/or the client device;
subsequent to determining the amount of time delay:
determining that the user has subsequently requested the automated assistant to cause a particular modification to a current operational status of the client device;
providing, in response to determining that the user has subsequently requested the automated assistant to cause the particular modification to the current operational status of the client device, another request to the server device and/or the client device to effectuate the particular modification to the current operational status of the client device;
determining, based on the amount of time delay and in response to determining that the user has requested that the automated assistant cause the particular modification to the current operational status of the client device, whether the amount of time delay indicates at least some basis to query the server device and/or the client device for second status data;
when the amount of time delay indicates at least some basis to not query the server device and/or the client device for the second status data:
bypassing, based on the amount of time delay, providing a status request to the server device and/or the client device; and
when the amount of time delay indicates at least some basis to query the server device and/or the client device for the second status data:
providing, based on the amount of time delay, the status request to the server device and/or the client device, and
receiving, in response to the server device and/or the client device receiving the status request, the second status data, which characterizes an operational status update for the client device.

18. The method of claim 17, further comprising:
subsequent to determining the amount of time delay:
causing a user interface of a separate client device to provide content that characterizes the current operational status of the client device.

19. The method of claim 18,
wherein the user interface of the separate client device is a display panel and provides graphical content that characterizes the current operational status of the client device, and
wherein the method further comprises:
when the amount of time delay indicates at least some basis to query the server device and/or the client device for the second status data:
causing the display panel to render other graphical content that characterizes the operational status update for the client device.

20. The method of claim 17, wherein the amount of time delay characterizes a particular time period between: providing the request to the server device and/or the client device to effectuate the modification to the operational status of the client device, and receiving the first status data from the server device and/or the client device.

* * * * *